US010202767B2

(12) United States Patent
Di Trapani

(10) Patent No.: US 10,202,767 B2
(45) Date of Patent: Feb. 12, 2019

(54) LIGHTING SYSTEM FOR SIMULATING NATURAL LIGHTING AND INCLUDING AN INFARED LIGHT SOURCE

(71) Applicant: COELUX S.R.L., Lomazzo (IT)

(72) Inventor: Paolo Di Trapani, Lomazzo (IT)

(73) Assignee: CoeLux S.r.l., Como (IT)

( * ) Notice: Subject to any disclaimer, the term of this patent is extended or adjusted under 35 U.S.C. 154(b) by 0 days.

(21) Appl. No.: 15/773,504

(22) PCT Filed: Nov. 11, 2016

(86) PCT No.: PCT/IB2016/056818
§ 371 (c)(1),
(2) Date: May 3, 2018

(87) PCT Pub. No.: WO2017/081660
PCT Pub. Date: May 18, 2017

(65) Prior Publication Data
US 2018/0320376 A1 Nov. 8, 2018

(30) Foreign Application Priority Data

Nov. 13, 2015 (IT) .......................... 102015000072639

(51) Int. Cl.
G02B 5/02 (2006.01)
E04B 9/32 (2006.01)
(Continued)

(52) U.S. Cl.
CPC .............. *E04B 9/32* (2013.01); *F21V 3/0615* (2018.02); *F21V 3/0625* (2018.02); *F21V 7/005* (2013.01);
(Continued)

(58) Field of Classification Search
CPC ............ F21V 7/0008; F21S 8/033; F21S 8/04
See application file for complete search history.

(56) References Cited

U.S. PATENT DOCUMENTS

2010/0020538 A1* 1/2010 Schulz .................. F21V 7/0008
362/235
2011/0194270 A1* 8/2011 Di Trapani ............... F21V 9/30
362/2
(Continued)

FOREIGN PATENT DOCUMENTS

DE 10256383 6/2004
WO 2015173770 11/2015

OTHER PUBLICATIONS

International Search Report and Written Opinion for application No. PCT/IB2016/056818 dated Mar. 13, 2017.

*Primary Examiner* — Andrew Coughlin
(74) *Attorney, Agent, or Firm* — DiBerardino McGovern IP Group LLC

(57) ABSTRACT

A lighting system to simulate a window open to the sky and comprising an optical system including: a visible optical source, which emits visible optical radiation; and a chromatic optical device, which includes a diffusion region and defines a first emission surface arranged downstream of the diffusion region. The chromatic device receives the visible optical radiation and generates, on the first emission surface, a visible output beam, which has an angular luminance profile that exhibits a peak with FWHM below 20° in two planes, mutually orthogonal and containing the direction of maximum luminance. In each point of the first emission surface, the visible output beam comprises a direct component, emitted in the direction of the luminance peak, and a diffuse component emitted at angles that differ by more than 40° from the direction of the direct component. The CCT of the diffuse component is at least 1.2 times higher than the CCT of the direct component. The lighting system also includes an infrared source, which defines a second emission surface and emits, downstream of the second emission surface, an infrared output beam substantially without visible components.

13 Claims, 7 Drawing Sheets

(51) Int. Cl.
*F21V 3/06*  (2018.01)
*F21V 9/02*  (2018.01)
*F21V 7/00*  (2006.01)
*F21V 7/06*  (2006.01)
*E04D 13/03*  (2006.01)
*F21Y 103/10*  (2016.01)
*F21Y 115/10*  (2016.01)

(52) U.S. Cl.
CPC .............. *F21V 9/02* (2013.01); *G02B 5/0242* (2013.01); *E04D 2013/034* (2013.01); *F21V 7/0091* (2013.01); *F21V 7/06* (2013.01); *F21Y 2103/10* (2016.08); *F21Y 2115/10* (2016.08)

(56) References Cited

U.S. PATENT DOCUMENTS

| | | | |
|---|---|---|---|
| 2012/0063164 A1* | 3/2012 | Chang | G02B 6/0046 362/606 |
| 2014/0043856 A1* | 2/2014 | Thompson | F21V 3/049 362/613 |
| 2014/0070724 A1* | 3/2014 | Gould | H05B 37/02 315/291 |
| 2014/0133125 A1 | 5/2014 | Di Trapani | |

\* cited by examiner

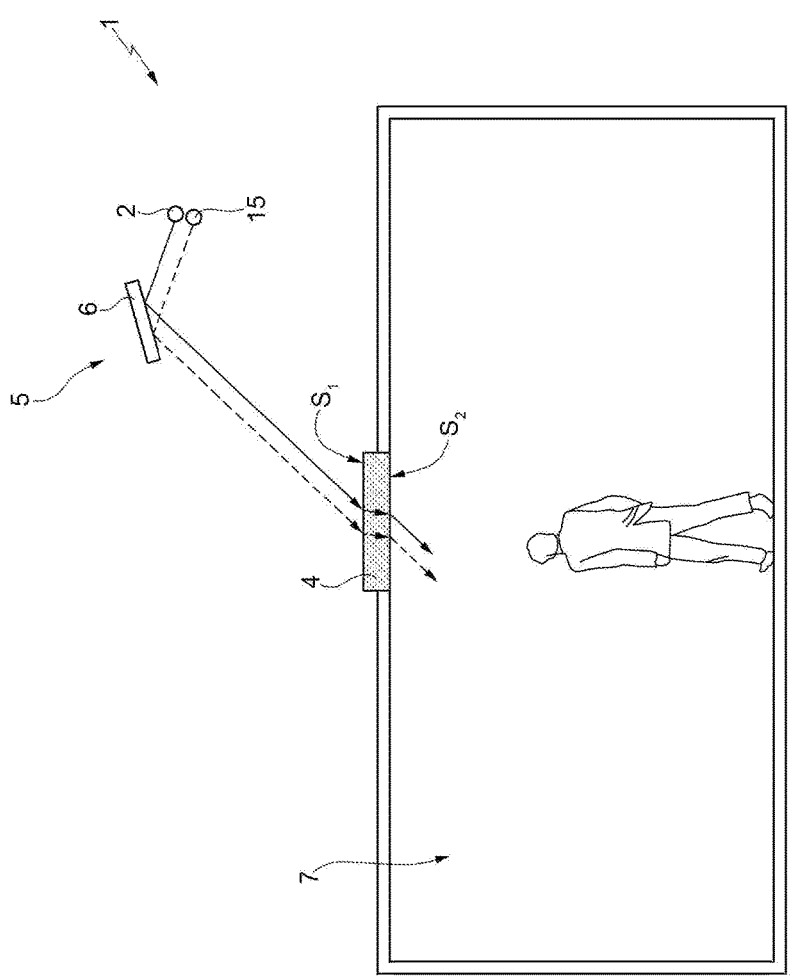

LIGHTING SYSTEM FOR SIMULATING NATURAL LIGHTING AND INCLUDING AN INFARED LIGHT SOURCE

CROSS REFERENCE TO RELATED APPLICATIONS

This application is a U.S. Nationalization of PCT Application Number PCT/IB2016/056818, filed on Nov. 11, 2016, which claims priority to Italian Patent Application No. 102015000072639, filed on Nov. 13, 2015, the entireties of which are incorporated herein by reference.

TECHNICAL FIELD

The present invention relates to a lighting system for simulating natural lighting and including an infrared light source.

DISCLOSURE OF INVENTION

It is known that artificial lighting systems for indoor environments are currently available that have the goal of improving the visual comfort of users. In particular, there are known lighting systems for simulating natural lighting, i.e. the type of lighting found in outdoor environments.

For example, European patent application EP2304480 describes a lighting system that comprises a light source capable of generating visible light and a panel containing nanoparticles. In use, the panel receives light rays coming from the light source and acts as a so-called Rayleigh diffuser, i.e. it scatters the light rays in a manner similar to that which occurs in the Earth's atmosphere in clear-sky conditions. Further details regarding the panel referred to in European patent application EP2304480 are described in European patent application EP2304478.

In particular, the lighting system described in European patent application EP2304480 simulates natural lighting because it generates, inside an environment that it illuminates, direct light with a low correlated colour temperature (CCT), which simulates direct light coming from the sun and generates shadows in the presence of illuminated objects; in addition, the lighting system generates high-CCT diffused light, which simulates daylight and gives shadows a bluish tone.

Instead, patent application PCT/IB2013/060141, filed on 14 Nov. 2013, describes a lighting system based on the fact that, given a light source that stands out on a background and is observed by an observer through a Rayleigh diffusor panel, the observer has difficulty in perceiving the effective distance of the light source if the background is uniform. In practice, the lighting system is based on the fact that the observer is induced to perceive the light emitted from the diffuser panel as coming from a virtually infinite distance, as long as the light generated by the light source is within the observer's field of view. In fact, the diffuser panel acts as a secondary light radiation source, which, due to the high spatial uniformity, prevents the observer from evaluating the effective distance separating him/her from the diffuser panel.

The lighting system described in patent application PCT/IB2013/060141 effectively enables simulating natural lighting conditions in a highly credible manner, and in particular enables generating visible optical stimuli fully comparable with those generated when a room is lit through a window. However, this lighting system limits itself precisely to artificially replicating stimuli of a purely visual nature, although in reality, when an observer is in a room lit by a window, he/she is also subjected to stimuli of a different type.

DISCLOSURE OF INVENTION

The object of the present invention is therefore to provide a lighting system that at least partly overcomes the drawbacks of the known art.

According to the invention, a lighting system is provided as defined in the appended claims.

BRIEF DESCRIPTION OF THE DRAWINGS

For a better understanding of the invention, some embodiments will now be described, purely by way of non-limitative example, and with reference to the accompanying drawings, in which:

FIGS. 6 and 7 schematically show cross-sections of embodiments of this lighting system, coupled to a room.

BEST MODE FOR CARRYING OUT THE INVENTION

Figure 1:
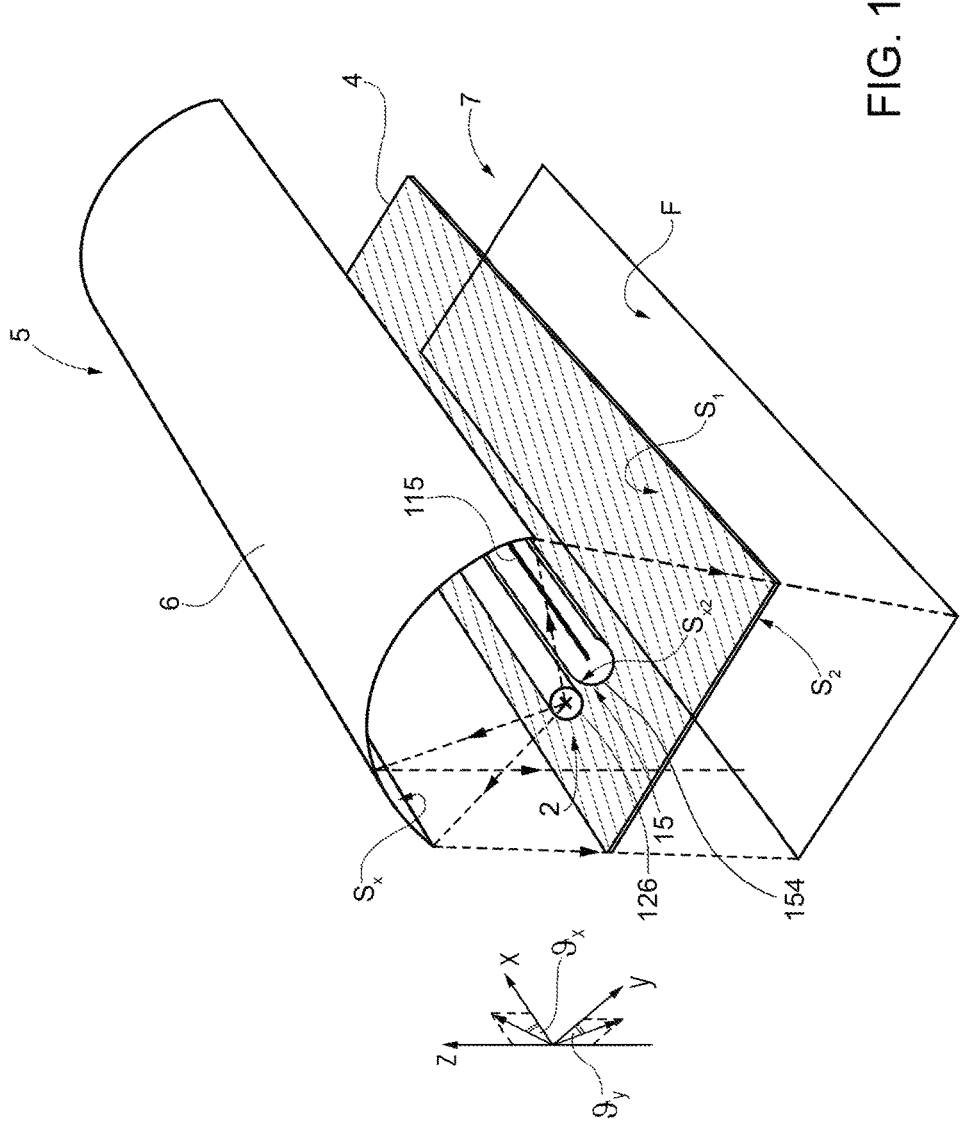
FIGS. 1, 4 and 9 schematically show perspective views of embodiments of this lighting system.

FIG. 1 shows a lighting system 1, which comprises a first optical source 2 and a diffuser panel 4, which, without any loss of generality, has a parallelepipedal shape and a thickness, for example, between 1 μm and 50 mm, preferably between 10 μm and 15 mm. It should be noted that within the context of this description, the term panel does not exclude the panel being flexible, rather than rigid.

The diffuser panel 4 is delimited above and below by a first and a second surface $S_1$ and $S_2$, respectively, which are parallel to each other. Furthermore, the lighting system 1 comprises a reflecting system 5, which includes at least one mirror 6 and is optically interposed between the first optical source 2 and the diffuser panel 4, as described hereinafter. For simplicity of description, it is assumed hereinafter that, even in the case where further mirrors are present (case not shown), mirror 6 is the last mirror before the diffuser panel 4; in other words, given an optical path that is formed by the reflecting system 5 and connects the visible source 2 to the diffuser panel 4, and in particular to the first surface $S_1$, mirror 6 causes the last deviation (i.e. a last change in direction) of the optical path, before the diffuser panel 4.

The visible source 2 mainly emits visible radiation, i.e. radiation with wavelengths in the range between 400 nm and 700 nm; in particular, the visible source 2 emits electromagnetic radiation having most of the radiant flux, for example at least 55%, preferably at least 70%, and more preferably at least 80%, in the range between 400 nm and 700 nm. This definition of visible radiation (between 400 nm and 700 nm) is maintained in the remainder of this description.

In particular, the visible source 2 emits visible light with a spectral width Δλ preferably greater than 100 nm, more preferably greater than 170 nm. The spectral width Δλ can be defined as the standard deviation of the wavelength spectrum of the visible source 2. Further details of the visible source 2 are described hereinafter.

The diffuser panel 4 works like a Rayleigh scatterer, i.e. essentially, it does not absorb visible radiation and scatters the short-wavelength components of the light more efficiently with respect to the long-wavelength components. In particular, the diffuser panel 4 scatters light rays with a wavelength λ=450 nm (blue) at least 1.2 times, preferably at least 1.4 times, and more preferably at least 1.6 times more effectively with respect to light rays with a wavelength λ=650 nm (red), the scattering efficiency being given by the ratio between the radiant power of the diffused light and the radiant power of the incident light.

In detail, assuming that a standard optical beam, generated by a CIE (Commission Internationale de l'Éclairage/International Commission on Illumination) D65 standard point light source placed far away from the diffuser panel 4 (hence, a beam composed of mutually parallel light rays), perpendicularly impinges onto the first surface $S_1$, the diffuser panel 4 is such that it separates the standard optical beam into the following components:

- a transmitted component, formed by light rays of the standard optical beam that pass through the diffuser panel 4 and do not undergo significant deviations, i.e. light rays that undergo a deviation of less than, for example, 0.1°, with a luminous flux that is a fraction $\tau_{diretta}$ of the overall luminous flux associated with the standard optical beam that strikes the diffuser panel 4;
- a forward diffuse component, formed by light rays of the standard optical beam that leave the second surface $S_2$ along directions that are distributed around a direction perpendicular to the second surface $S_2$ (with the exception of the perpendicular direction and directions that differ from this perpendicular direction by an angle of less than, for example, 0.1°), with a luminous flux that is a fraction $\tau_{diffusa}$ of the overall luminous flux associated with the standard optical beam that impinges onto the diffuser panel 4;
- a backward diffuse component, formed by light rays of the standard optical beam that leave the first surface $S_1$ along directions that are distributed around a direction perpendicular to the first surface $S_1$ (with the exception of the perpendicular direction and directions that differ from this perpendicular direction by an angle of less than, for example, 0.1°), with a luminous flux that is a fraction $\rho_{diffusa}$ of the overall luminous flux associated with the standard optical beam that impinges onto the diffuser panel 4; and
- a reflected component, formed by light rays of the standard optical beam that leave the first surface $S_1$ along directions distributed around a direction perpendicular to the first surface $S_1$ and differing from that perpendicular direction by an angle of less than, for example, 0.1°, with a luminous flux that is a fraction $\rho_{diretta}$ of the overall luminous flux associated with the standard optical beam that strikes the diffuser panel 4.

In greater detail, the optical properties of the diffuser panel 4 are such that:

$\tau_{diffusa}$ falls within the range 0.05-0.5, preferably 0.07-0.4, more preferably 0.1-0.3, and even more preferably 0.15-0.25;

the average correlated colour temperature $CCT\_\tau_{diffusa}$ of the forward diffuse component is higher than the average correlated colour temperature $CCT\_\tau_{diretta}$ of the transmitted component, i.e. $CCT\_\tau_{diffusa} > h*CCT\_\tau_{diretta}$, where h=1.2, preferably h=1.3, and more preferably h=1.5;

preferably, the diffuser panel 4 does not absorb a significant amount of incident light, i.e. the sum $\tau_{diretta} + \tau_{diffusa} + \rho_{diretta} + \rho_{diffusa}$ is at least equal to 0.8, preferably 0.9, more preferably a 0.95, and even more preferably 0.97;

preferably, the diffuser panel 4 scatters mostly forwards, i.e. $\tau_{diffusa} > \eta * \rho_{diffusa}$, where η is at least equal to 1.1, preferably η=1.3, more preferably η=1.5, and even more preferably η=2; and preferably, the diffuser panel 4 has a low reflection, i.e. $\rho_{diretta} < 0.09$, preferably <0.06, more preferably <0.03, and even more preferably <0.02.

From a structural standpoint, the diffuser panel 4 comprises a solid matrix of a first material (preferably glass or silica sol-gel, because visible and infrared radiation is not absorbed, or a thermoplastic resin, a thermosetting resin, a photo-hardening resin, an acrylic resin, an epoxy resin, polyester based resin, a polystyrene based resin, a polyolefin resin, a polyamide resin, a polyimide resin, a polyvinyl alcohol based resin, a butyric resin, a fluorine based resin, a vinyl acetate resin or plastics such as polycarbonate, liquid crystal polymers, polyphenylene ether, polysolfone, polyether sulphone, polyacrylate, amorphous polyolefin or mixtures or copolymers thereof), in which nanoparticles of a second material (for example, an inorganic oxide such as ZnO, $TiO_2$, $ZrO_2$, $SiO_2$, $Al_2O_3$, or a polymeric material, or a combination of two or more of these materials) are dispersed, the second material having an index of refraction different from the index of refraction of the first material. Substantially, neither of the first and second materials absorb visible electromagnetic radiation. The diffuser panel 4 is therefore without, for example, phosphors or fluorescent elements, although other embodiments are possible (not shown), in which the diffuser panel 4 contains one or more of these elements.

Without any loss of generality, in the embodiment shown in FIG. 1, the diffuser panel 4 is uniform, in the sense that, given any point of the diffuser panel 4, the physical characteristics of the diffuser panel 4 in that point do not depend on the actual point. Furthermore, the diffuser panel 4 is monolithic, i.e. the solid matrix does not exhibit any discontinuities due to coupling by gluing or mechanical means. In addition, the diffuser panel 4 has no holes/cavities, i.e. the first and second surfaces $S_1$ and $S_2$ are simply connected. These characteristics of the diffuser panel 4 are not necessary for the purposes of the present invention, but make the diffuser panel 4 easier to manufacture.

In detail, the nanoparticles may be monodispersed or polydispersed; moreover, the nanoparticles can be spherical or have another shape. The effective diameter D of the nanoparticles (see below for definition in the case of a non-spherical shape) falls within the range [5 nm-350 nm], preferably [10 nm-250 nm], more preferably [40 nm-180 nm], and even more preferably [60 nm-150 nm], the effective diameter D being given by the product of the diameter of the nanoparticles and the index of refraction of the first material. In the case of non-spherical nanoparticles, the effective diameter D can be defined as the effective diameter of equivalent spherical particles, i.e. the effective diameter of spherical particles having the same volume as the above-mentioned particles; in this regard, the equivalent spherical particles have a diameter known as an equivalent diameter and such that the equivalent spherical particles have precisely the same volume as the corresponding particles.

Still with reference to the diffuser panel 4, this is at least partially transparent in the visible spectrum, consequently allowing the transmission of light capable of forming images. In this regard, as previously mentioned and within the context of this description, except where specified otherwise, the light "transmitted" by an optical element is understood to be part of the light rays that impinge on the optical element and pass through the optical element without undergoing significant angular deviation ascribable to diffusion processes, for example, being deviated by an angle of less than 0.1°. Furthermore, an optical element is considered to be at least partially transparent for a given light beam incident thereon if it transmits at least part of this light beam.

In particular, still considering the above-mentioned standard optical beam generated by a D65 standard point light source placed far away from the diffuser panel 4 and directed perpendicularly onto the latter, preferably the diffuser panel 4 is such that at least 50%, more preferably 70%, and even more preferably 85% of the standard optical beam's light rays are emitted by the diffuser panel 4 inside a cone with an angular aperture, measured "full width at half maximum" (FWHM), not greater than 8°, preferably 4°, and even more preferably 2°.

Again, with reference to the embodiment shown in FIG. 1, the lighting system 1 is optically coupled to a closed environment, formed, for example, by a room 7 (i.e. a closed, or in any case covered, environment), via the diffuser panel 4. For example, the diffuser panel 4 enables optically coupling the visible source 2 to the room 7, of which only a portion of the floor F is shown in FIG. 1.

The lighting system 1 also comprises a second optical source 15, which shall be referred to hereinafter as the infrared source 15.

In greater detail, the infrared source 15 emits infrared radiation, i.e. radiation with a wavelength in the range between 0.7 μm and 1 mm, preferably between 0.7 μm and 25 μm, and more preferably between 0.7 μm and 10 μm, which comprises the spectral region between 0.7 μm and 1.44 μm (also known as near-infrared or IR-A) and the spectral region between 1.44 μm and 3 μm (also known as short-wavelength infrared or IR-B) and the spectral region with wavelengths longer than 3 μm (also known as long-wavelength infrared or IR-C).

In particular, the infrared source 15 emits electromagnetic radiation having most of the radiant flux, for example at least 55%, preferably at least 70%, and more preferably at least 80%, in the range between 0.7 μm and 3 μm. Furthermore, the infrared source 15 substantially does not emit visible light, as described in greater detail hereinafter.

The infrared source 15 may comprise, for example, a LED that emits in the infrared, but not in the visible spectrum, such as a LED that emits in the region between 800 nm and 1 μm, for example, a LED that emits at 810 nm, or 850 nm, or 880 nm, or 940 nm or 950 nm.

In some configurations, the infrared radiation source does not comprise any optical-optical converter, such as a phosphor that absorbs light of a given wavelength and re-emits it with a longer wavelength.

The infrared radiation source may comprise a Planckian emitter, i.e. a source that emits a spectrum close to the black body spectrum at a given temperature, for example a temperature between 3000K 300K, preferably between 2000K and 500K, and more preferably between 1500 and 1000K.

The infrared source 15 may be such that the dependency of the spectral density of the radiant flux on wavelength produces a peak that falls in the infrared spectrum, preferably in the region between 1 μm and 2.5 μm, more preferably between 1.2 μm and 2 μm, and even more preferably between 1.3 μm and 1.6 μm. To this end, the infrared source 15 may comprise a Planckian radiator, which preferably has a temperature in the range 1160-2900K, more preferably 1450-2416K, and even more preferably 1810-2230K. Furthermore, the infrared source 15 is preferably without wavelength converters of the optical-optical type, such as phosphors.

The infrared radiation source may, for example, comprise a resistor through which electric current runs, such as a filament or halogen lamp, or a radiating element heated by combustion of a gaseous fuel, such as propane, natural gas or butane, or a liquid fuel, such as diesel fuel, alcohol, LPG or paraffin, or a solid fuel, such as wood, coal or peat. The infrared radiation source may also comprise a radiant panel working at a low temperature, for example a temperature below 100° C., which emits in the IR-C region, this panel being made, for example, of a ceramic material, or nickel, or carbon fibre.

In some configurations, such as the case of a source comprising a Planckian radiator, for example a Planckian radiator at a temperature above 1000K, or above 2000K, or above 2500K, the infrared radiation source may comprise or be optically coupled to a low-pass optical filter (not shown in FIG. 1) designed to filter (and therefore remove) the visible component of the radiation emitted by the aforesaid source. For example, this low-pass optical filter may operate through absorption of radiation with wavelengths below 700 nm, or below 800 nm, or below 900 nm, by a semiconductor material having a band-gap for a photon energy value corresponding to the cut-off frequency. The low-pass optical filter may also operate by reflection of the visible radiation component, for example of the component with wavelengths below 700 nm, or below 800 nm, or below 900 nm, and transmission of the infrared component.

In one configuration, the infrared radiation source generates radiation exclusively or mainly in the IR-A region, for example in the region between 780 nm and 1400 nm, at a temperature of approximately 1300° C. Thanks to the short wavelength, this configuration enables relatively precise IR radiation collimation.

In a different configuration, the infrared radiation source generates radiation exclusively or mainly in the IR-B and IR-C regions, being substantially without radiation in the IR-A region, or containing a limited fraction of power in the IR-A region, for example a fraction of less than 40%, preferably less than 25%, and even more preferably less than 15% of the total power. In fact, in spite of the fact that solar radiation contains IR-A more than anything else, greater efficaciousness of IR radiation for the purposes of producing comfortable warming of the human body is obtained with IR-B and IR-C radiation, due to the high reflection of the skin for IR-A (>35%) and the high penetration of IR-A radiation under the derma. IR-A can actually be transmitted into the subcutaneous fat layers, penetrating through the derma and heating hair bulbs, sebaceous glands, nerves and sweat glands. Due to the high energy, high transmission and low absorption, IR-A radiation can damage the skin and, for this reason, it is the least indicated for uses aimed at comfortable warming.

In a further configuration, the infrared radiation source mainly contains radiation in the IR-B region, for example containing at least 55% of the power in IR-B, or at least 60%, or preferably 70%, or more preferably at least 80%. For example, the source comprises an emitter at a temperature between 500° C. and 800° C. Due to the absorption efficiency of water in this spectral region, IR-B is efficaciously absorbed by the skin, being transmitted through the epidermis to the layers beneath the derma, without however heating the functional organs of the skin (glands, nerves, etc.).

In a further configuration, the infrared radiation source mainly contains radiation in the IR-C region, for example containing at least 55% of the power in IR-C, or preferably at least 70%, or more preferably at least 80%. IR-C is the radiation that ensures maximum absorption by the skin, which more or less absorbs it completely in the surface layer or epidermis, maximizing efficiency and minimizing the risk of damage to the skin. The drawback in using IR-C is the high cost of the sources, as well as the greater difficulty in setting a precise direction for the radiation.

In a different configuration, the infrared radiation source contains all of the IR-A, IR-B and IR-C contributions; for example, it is possible for the infrared source to contain mainly IR-B, having, for example, at least 55% of the power in IR-B, or at least 60%, or preferably 70%, or more preferably at least 80%, while the remaining power is subdivided more or less equally between IR-A and IR-C, for example, ensuring that the P(IR-A)/P(IR-B) power ratio is between 0.5 and 1.5, preferably between 0.7 and 1.3, or more preferably between 0.8 and 1.2. This configuration ensures excellent warming of all skin layers, ensuring an optimal compromise between efficiency, comfort, costs and health-related safety.

The visible source 2 and the infrared source 15 are different from each other and generate radiation independently, on the basis of different physical phenomena (for example, spontaneous/stimulated emission associated with a possible optical conversion to a first and a second frequency, or black body emission). Therefore, the radiant flux per unit wavelength of the overall radiation emitted may produce at least one peak in the visible spectrum (for example, at 470 nm) and a peak in the infrared spectrum (for example, at 1.4 μm). Furthermore, indicating the integral in the visible region of the spectrum of the radiant flux per unit wavelength emitted by the visible source 2 as $P_{vis}$, and indicating the integral in the infrared region of the spectrum of the radiant flux per unit wavelength emitted by the infrared source 15 as $P_{IR}$, preferably gives $P_{vis}/P_{IR}<0.3$, more preferably $P_{vis}/P_{IR}<0.1$, and even more preferably $P_{vis}/P_{IR}<0.05$.

In the following, the radiation emitted by the infrared source 15 will be referred to as the infrared optical beam. As previously explained, the infrared optical beam is substantially without components in the visible spectrum.

That having been said, as shown in FIG. 1, the mirror 6 defines a concave type of reflective surface $S_x$.

In detail, the reflective surface $S_x$ has the form of a concave surface, such as a paraboloid with cylindrical symmetry, i.e. it has the shape of a portion of a parabolic cylinder, this portion being obtained by intersecting the parabolic cylinder with three secant planes. In this regard, it is known that, given a parabola generator and a reference line R, the parabolic cylinder is the striped surface formed by the lines parallel to the reference line R and incident on the parabola generator; in other words, the parabolic cylinder is obtained through translation of the parabola generator along the reference line R. In the following, the reference line R is also called the axis of the cylinder and is coincident with the x-axis of an xyz orthogonal reference system. Moreover, the line of the foci of the parabolas that form the parabolic cylinder coincides with the x-axis (in FIG. 1, the xyz reference system is shown in an offset position for visual simplicity). Without any loss of generality, it is also assumed that the xy plane is parallel to the floor F of the room 7 and that the vertices of the parabolas are vertically aligned with the foci line, i.e. parallel to the z-axis. For completeness, in FIG. 1, the angles $\theta_x$ and $\theta_y$ are used to indicate angular directions in the xz plane and in the yz plane, respectively.

Again, with reference to the visible source 2, this comprises an illuminator 126, which has an elongated shape along the x-axis, so as to lie, in a first approximation, along the foci line. In addition, it is assumed that the direction of maximum luminous flux generated by the illuminator 126 is parallel to the z-axis.

In practice, referring to the visible radiation emitted by the illuminator 126 as the visible optical beam, the reflective surface $S_x$ receives the visible optical beam and reflects it, collimating it in the yz plane. In other words, the reflected optical beam has a divergence in the yz plane that depends, in a manner which is in itself known, on the focal length of the reflective surface $S_x$, as well as, among other things, on the width of the illuminator 126 along the y-axis.

Instead, with regard to the xz plane, the reflection process of the visible optical beam by the reflective surface $S_x$ does not entail any change in divergence. Therefore, the reflected optical beam maintains, in the xz plane, the same divergence of the visible optical beam as generated by the illuminator 126. In this regard, the illuminator 126 preferably emits the visible optical beam so that it has reduced divergence in the xz plane, and also so that it has an angular luminance profile $L(\theta_x)$ in the xz plane that as far as possible is the same as the luminance profile $L(\theta_y)$ in the yz plane of the reflected optical beam, for example for any position value x,y and for any angular direction value $\theta_x$ in the xz plane for which the luminance $L(x,y,\theta_x,\theta_y)$ is significant (for example, greater than 10% of maximum luminance value). Furthermore, the luminance profile generated by the illuminator 126 (for example, in a plane parallel to the xy plane) is, in a first approximation, independent of the x coordinate, i.e. it is preferable that the following holds along the x-axis:

$$L_{x=x1}(\theta_x,\theta_y)=L_{x=x2}(\theta_x,\theta_y)$$

In this regard, it is recalled that the luminance is the luminous flux in a beam that originates from a surface (or that falls on a surface) along a given direction, per unit projected area of the surface, as seen along the given direction, and per unit solid angle, as indicated for example in ASTM (American Society for Testing and Materials) standard E284-09a.

In practice, the illuminator 126 may be such that the visible optical beam it generates exhibits a luminance that substantially does not depend on the x coordinate, has a weak dependence with respect to $\theta_y$ (for example, in the yz plane, it may have a luminance profile $L(\theta_y)$ with FWHM greater than 60°, preferably 90°, and more preferably 120°) and also exhibits a relatively narrow peak with respect to $\theta_x$ (for example, in the xz plane, it may have a luminance profile $L(\theta_x)$ with FWHM below 45°, preferably 30°, and more preferably 150).

Summarizing, since the reflective surface $S_x$ has a focusing power in the yz plane, downstream of it, the reflected optical beam still has a luminance profile $L(\theta_y)$ with FWHM below 45°, preferably 30°, and more preferably 15°, and in any case preferably approximately equal to the luminance profile $L(\theta_x)$, i.e. with FWHMs that preferably differ from each other by not more than a factor of 3, preferably 2, and more preferably 1.5. This result is achieved starting from the illuminator 126, the luminance profile of which is uniform along the x-axis, but is angularly anisotropic, in the sense that the dependence of the luminance profile on $\theta_x$ and on $\theta_y$ is characterized by different FWHMs. In particular, the visible optical beam generated by the illuminator 126 has reduced divergence in the xz plane and high divergence in the yz plane; in other words, the visible optical beam generated by the illuminator 126 is more collimated in the xz plane than in the yz plane.

The thus-generated reflected optical beam then impinges onto the first surface $S_1$ of the diffuser panel 4, which, as explained, generates a diffuse component with wide divergence and a transmitted component, which shall also be referred to hereinafter as the transmitted optical beam. In this regard, in a first approximation, it can be assumed that, apart from a translation of the spectrum towards higher wavelengths, the optical properties of the optical beam transmitted from the diffuser panel 4 are substantially similar to those of the reflected optical beam.

In this way, an observer downstream of the diffuser panel 4 who observes the second surface $S_2$ perceives a sun standing out in a blue sky, this sun having the same magnitude along the x-axis and y-axis and being set, virtually, at an infinite distance; this effect is obtained having an illuminator of any length along the x-axis. An observer walking along the y-axis who passes through the beam will see a blue sky when in the shade and will see the sun appear above his/her head upon entering the light beam. An observer who walks under the beam in the direction of the x-axis will see the sun above his/her head while walking, consistent with the fact that the sun is perceived to be at an infinite distance.

In other words, the embodiment shown in FIG. 1 provides for emitting visible radiation from an emission surface (the second surface $S_2$), which simulates a skylight or a window. Furthermore, on the emission surface, the visible radiation has a luminance profile similar to that produced by the sun and the sky on the surface of a window. In particular, downstream of the second surface $S_2$, there is a direct visible component with relatively low divergence, for example a divergence of less than 15°, preferably less than 100, which shall again be referred to hereinafter as the visible optical beam, and a diffuse component with high divergence (isotropic in a first approximation), the diffuse component having a CCT higher (for example 1.2 times higher) than the CCT of the direct component.

Figure 2:
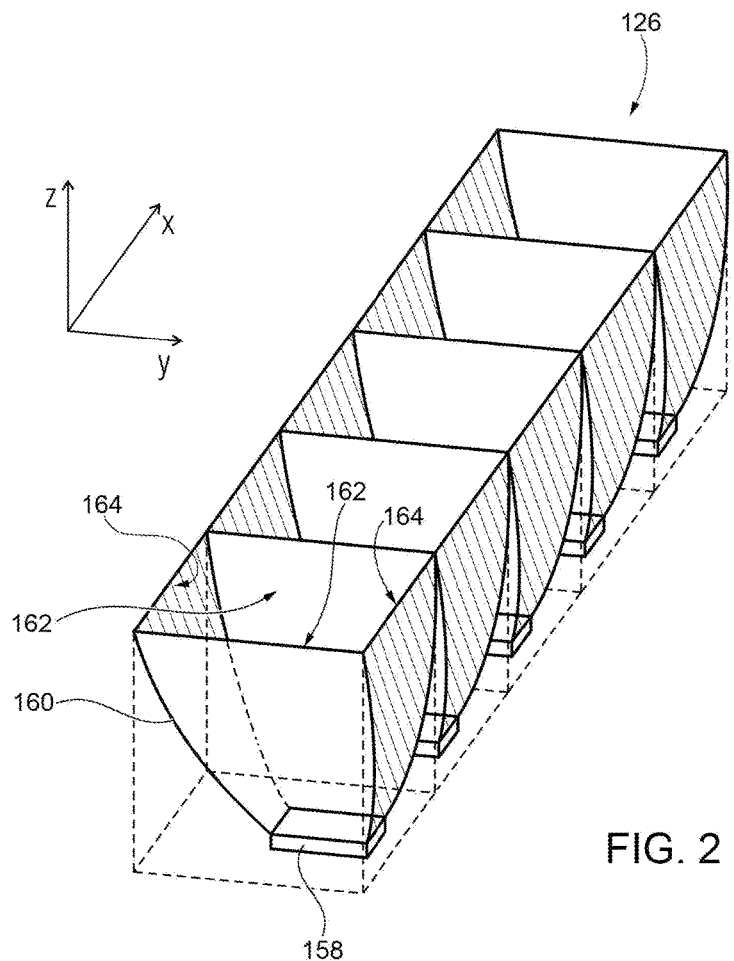
FIG. 2 schematically shows a perspective view of an illuminator employed in one embodiment of this lighting system.

For practical purposes, the illuminator 126 may be formed as shown in FIG. 2.

In detail, the illuminator 126 is formed by an array of emitters 158, for example of an anisotropic type (for example, white rectangular LEDs), which are arranged along the x-axis. Each emitter 158 is optically coupled to a corresponding compound parabolic concentrator (CPC) 160, of a reflective type.

For example, the CPCs 160 are equal to each other. In addition, each CPC 160 is arranged downstream of the corresponding emitter 158 and has a rectangular shaped inlet opening, designed to receive the radiation emitted by the corresponding emitter 158. In addition, each CPC 160 has a rectangular shaped outlet opening, which is parallel to the xy plane and to the corresponding inlet opening, and has an area larger than the area of the corresponding inlet opening.

In greater detail, each CPC 160 comprises a first pair of parabolic faces 162, opposite to and facing each other; these parabolic faces 162 are reflective and have a curvature so as to reduce the divergence of the radiation emitted by the corresponding emitter 158 in the xz plane, for example up to a value of 15°. In addition, each CPC 160 includes a further pair of (optional) parabolic faces 164, which are reflective and are opposite to and facing each other. Furthermore, parabolic faces 164 have a curvature so as to reduce the divergence of the radiation emitted by the corresponding emitter 158 in the yz plane, for example up to a value of 90°. Preferably, the outlet openings of the CPCs 160, which face towards the mirror 6, are arranged in a contiguous manner.

Although not shown, embodiments are however possible in which the parabolic faces 164 are flat, in which case, in the yz plane, the radiation leaving the CPCs 160 maintains the same divergence that characterizes the radiation emitted by the emitters 158. More generally, the shape and curvature of the CPCs 160 may vary with respect to that described. In addition, the emitters 158 may be equipped with respective lenses, for example in order to reduce divergence in the xz plane. Moreover, reflectors based on the principle of total internal reflection, also known as total-internal-reflector (TIR) lenses, may be present instead of or in addition to the CPCs 160.

Again, with reference to the embodiment shown in FIG. 1, the infrared source 15 also has an elongated shape, parallel to the x-axis. For example, the infrared source 15 can be formed by a filament 115 suitable for being heated, which is elongated parallel to the x-axis, and from which it is offset the least amount possible that is compatible with the form of the illuminator 126. For example, it is possible that the x-axis, and therefore the foci axis of the reflective surface $S_x$, lies in the plane on which the outlet openings of the CPCs 160 lie. The position of the filament 115 in FIG. 1 is purely illustrative.

Figure 3A:
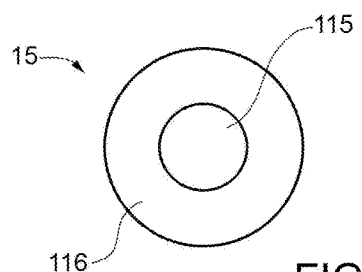
FIGS. 3a and 3b schematically show cross-sections of an infrared source.

The filament 115 is, for example, surrounded by an optical filter 116 (only qualitatively shown in FIG. 3*a*), which is designed to filter, and therefore remove, the visible components of the radiation emitted by the filament 115 when heated.

In practice, the filament 115 and the associated optical filter 116 emit infrared radiation in a Lambertian manner; however, at least part of the infrared radiation is collimated in the yz plane by the mirror 6. Therefore, after being reflected by the mirror 6, the infrared optical beam still has relatively small divergence in the yz plane, while it has larger divergence in the xz plane.

In general, independently of how the infrared optical beam is generated, it may thus have a larger divergence in the xz plane downstream of the reflective surface $S_x$ with respect the corresponding divergence of the visible optical beam. This consequently also applies to the first and second surfaces $S_1$ and $S_2$. In this regard, it is possible to assume that the infrared optical beam substantially passes through the diffuser panel 4 without being subjected to any diffusion process; similarly, the infrared optical beam is entirely transmitted by the diffuser panel 4. Thus, the infrared optical beam and the visible optical beam are still overlapping on at least part of the second surface $S_2$, as well as in a space downstream of the latter.

In FIG. 1 also shows a blocking element 154, which defines an additional surface $S_{x2}$ designed to reflect the radiation generated by the filament 115.

For example, it is possible that the blocking element 154 is formed by a reflector, for example or the parabolic type, facing the reflective surface $S_x$ and with the foci axis parallel to the x-axis. In this case, the filament 115 is interposed between the reflective surface $S_x$ and the additional surface $S_{x2}$. If necessary, the filament 115 may extend along the foci axis of the additional surface $S_{x2}$. The infrared source 15 is thus laterally offset with respect to the visible source 2.

Figure 3B:
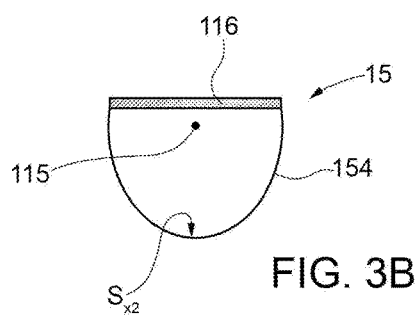

Embodiments of the type shown in FIG. 1, but where the optical filter 116 extends so as to close the opening defined by the additional surface $S_{x2}$, in a manner such that the filament 115 is interposed between the additional surface $S_{x2}$ and the optical filter 116, as shown in FIG. 3b, are also possible. In this way, the visible optical radiation generated by the filament 115 is reflected by the additional surface $S_{x2}$ and subsequently impinges onto the optical filter 116, after which the non-filtered (infrared) portion reaches the reflective surface $S_x$.

However, embodiments are also possible in which the lighting system 1 contains further blocking elements (not shown), for example designed to prevent the visible radiation emitted by the illuminator 126 from reaching the room 7 without having first been reflected by the reflective surface $S_x$, for example in the case where the illuminator 126 has shapes different from that previously shown.

For practical purposes, the applicant has noted that the observer has less sensibility regarding infrared radiation and, in particular, regarding the directionality of the infrared radiation. In particular, with regard to the infrared source 15, the observer is not able to perceive an image of it. Nevertheless, the observer perceives the warmth, or rather perceives a discontinuity between the absence and presence of heat, when entering the beam of visible radiation, i.e. when passing from shade to light.

In the case where the visible optical beam has a rectangular section in the xy plane with a much larger dimension in the x direction than in the y-direction, it is found that the maximum discontinuity is obtained in crossing the beam along y-direction, rather than along the x-direction. It is therefore preferable that the infrared radiation is collimated more in the y-direction, i.e. in the direction along which the visible optical beam has the smallest size, in order to ensure naturalness in perception and, in particular, in order to ensure the superimposition between maximum discontinuity in the shadow-light passage in the plane and maximum discontinuity in hot-cold passage.

In other words, in the case of a visible optical beam that illuminates a rectangular spot on the ground or a wall and has a significantly longer length in the x-direction than in the y-direction, it is preferable that the infrared beam illuminates this rectangle with a greater precision regarding the contrast along the longer sides. In this way, an observer entering the light spot along the y-direction of maximum contrast perceives warmth when in the light, without paying attention to the fact that the heat might not come from any particular direction in the xz plane. Only if the observer was equipped with an infrared visor would it be possible to see the image of the IR source extending much more in the x-direction than in the y-direction. Since the observer does not see the infrared source, it is possible to avoid collimating it along the x-direction, enabling savings on components and a lower cost for the device. Instead, if the infrared source emitted visible components, the observer would perceive the image of an elongated luminous object in one direction, losing the naturalness of perception.

In general, independently of the fact that the infrared source is collimated in only one rather than two directions, it is very complex to achieve exact superimposition between the solid angle under which the observer perceives the visible radiation and the solid angle from which the infrared radiation originates, given that the two sources are not easily superimposable. For this reason, it is generally important that the infrared source does not contain visible components, i.e. it is invisible to the observer.

That having been said, in the embodiment shown in FIG. 1, the beam of visible radiation and the beam of infrared radiation have respective illuminance [lux] and irradiance [W/m²] profiles such that an area is present on (at least) one plane downstream of the emission surface (the second surface $S_2$) that is illuminated and irradiated by both types of radiation. In other words, the two beams ensure the presence of a plane downstream of the emission surface on which a first area, characterized by an illuminance value of visible radiation >50% of the maximum illuminance value (visible spot) on said plane, and a second area, characterized by an irradiance value of infrared radiation >50% of the maximum irradiance value (IR spot) on said plane, overlap, for example overlapping on an area equal to at least 50% of the first and the second areas.

The aforesaid characteristics derive from the fact that the applicant has noted how, in order to simulate a window, it is possible to control the visible radiation in terms of luminance profile and distribution in angles and wavelength, as well as controlling both the visible radiation and the infrared radiation in terms of luminance and irradiation profiles in the plane where the observer will preferably be positioned. This is because the observer, perceiving a visual image of the scene reproduced by the visible radiation, is extremely sensitive to colours and the direction from which the light originates, while he/she is less sensitive to the direction from which the infrared radiation originates. In this regard, the applicant has also noted the existence of a psychological effect whereby, in the presence of visible radiation that simulates the presence of sky and sun, an observer perceives the infrared radiation as coming from the same direction as the sun, even if the infrared radiation actually originates from a different direction. In other words, the presence of a credible reconstruction of the image of the sky and sun favours the development of a kind of thermal illusion whereby the physical characteristics that enable inducing the perception of being exposed to the warmth of the sun are less restrictive with respect to those required in the absence of visible radiation. The applicant has then observed how, by exploiting this thermal illusion, it is possible to implement a less expensive and complex lighting system with respect to the case in which the problems of reconstruction of visual perception and thermal perception are resolved in a mutually independent manner. On the other hand, the so-called thermal illusion risks being made ineffective in the case where the infrared source is perceivable from a visual standpoint.

In the case of small windows, it is found that as the size of emission surface decreases, and therefore as the transverse dimension of the visible optical beam decreases, the depth of field in which the aforesaid superimposition between the visible spot and the IR spot is obtained also decreases. Therefore, in order to achieve good overlapping of the visual spot and the IR spot on different planes at different distances from the emission surface, it is possible to form the infrared beam in a way such that it has a radiance profile similar to the luminance profile that characterizes the visible beam; however, this entails adopting further optical components. In order to contain costs and complexity, the applicant has observed that it is possible to adopt an emission surface elongated along a first direction (x-axis); in this way, the visible radiation is collimated in the xy plane using collimation mechanisms that act independently in the xz plane and in the yz plane, the mechanism that acts in the yz plane being particularly inexpensive. Furthermore, in the case of an elongated emission surface, achieving a good depth of field with regard to the superimposition between the visible spot and the IR spot at different distances from the emission surface is also obtained by conditioning the irradiance of the IR beam just in the yz plane, where it has a profile similar to the luminance profile of the visible optical beam; the irradiance profile of the infrared beam in the xz plane is irrelevant. This is due to the fact that the observer perceives the greater visual contrast in the shade-light-shade passage when passing through the visible spot along the y-direction, rather than along the x-direction; for this reason, it is preferable that the observer perceives the cold-hot-cold contrast along the same direction. Furthermore, the small size of the emission surface along the y-direction causes separation of beams mainly along the y-direction, and so the depth of field is increased by controlling the irradiance profile only in the yz plane.

In addition, the applicant has observed how the same optical component used to control the luminance profile of the visible beam in the yz plane can be efficiently used to control the irradiance profile of the IR beam in the same plane.

Figure 4:
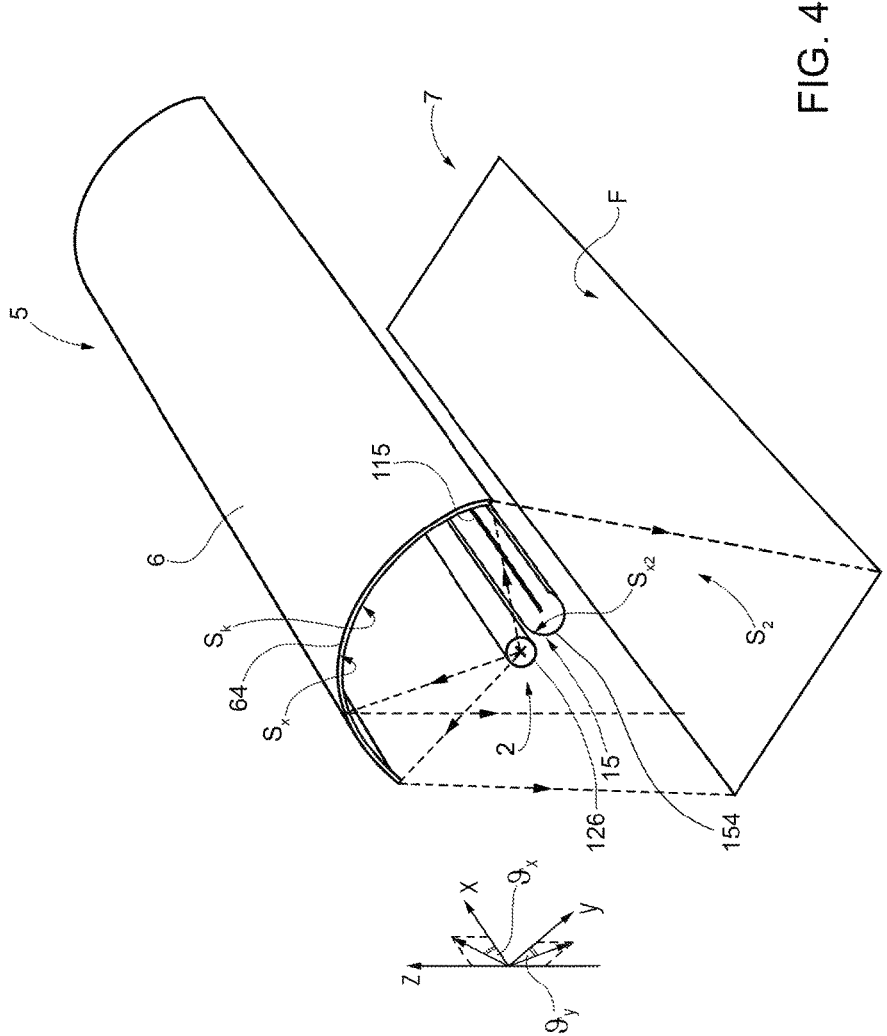

According to a different embodiment, shown in FIG. 4, the reflective surface $S_x$ is covered by a diffusion layer 64, which in turn defines a concave surface $S_k$, facing the reflective surface $S_x$. The concave surface $S_k$ acts as an emission surface.

From an optical standpoint, the diffusion layer 64 performs the optical function of the diffuser panel 4, which may therefore be absent; furthermore, the diffusion layer 64 is configured in a manner such that the optical characteristics of the visible optical beam and the infrared optical beam downstream of the concave surface $S_k$ correspond to that previously described in relation to the second surface $S_2$ of the diffuser panel 4, except where specified otherwise.

The diffusion layer 64 is formed, for example, by a polymer material, inside which nanoparticles of the previously described type are dispersed. By increasing the density of the nanoparticles, it is possible to reduce the thickness of the diffusion layer 64, for example down to values below 50 µm, preferably below 20 µm, and even more preferably below 10 µm; in this regard, the function of supporting the diffusion layer 64 is effectively performed by the mirror 6. In practice, the diffusion layer 64 may be formed by a polymer paint containing nanoparticles of the previously described type.

Based on what has been described, it follows that the diffusion layer 64 preferentially scatters short-wavelength components of the visible optical beam with respect to long-wavelength components; in other words, with respect to short-wavelength components, long-wavelength components have a greater probability of passing through the diffusion layer 64, being reflected by the reflective surface $S_x$ and returning through the diffusion layer 64 without being scattered. Furthermore, it can be assumed that any diffused radiation subsequently propagates in an isotropic manner, i.e. such as to exhibit equal intensity in approximately all directions. In a first approximation, the diffused light thus generates a luminance profile constant along the directions that point towards the half-plane delimited by the reflective surface $S_x$ and containing the diffusion layer 64. More generally, the diffused light generates a luminance profile that varies by less than a factor of 5, preferably less than a factor of 3, along the directions that point towards the half-plane delimited by the concave surface $S_k$ and not containing the diffusion layer 64; this characteristic is, however, also applicable to the diffused light generated on the second surface $S_2$ in the embodiment shown in FIG. 1. This luminance profile emulates the luminance profile of a clear sky.

In addition, in a first approximation, infrared radiation passes through the diffusion layer 64 without undergoing any diffusion process, similarly to what occurs in the case of the diffuser panel 4.

In practice, the mirror 6 and the diffusion layer 64 form a chromatic mirror CM. Furthermore, the portion of the visible optical beam that is reflected by the chromatic mirror CM without undergoing any diffusion, which shall be referred to hereinafter as the reflected optical beam, has a spectral content shifted towards longer wavelengths with respect to the spectral content that the visible optical beam has in output from the visible source 2.

The considerations set forth above with reference to surface $S_2$ are therefore also applicable to concave surface $S_k$.

The advantages that can be achieved with this lighting system clearly emerge from the foregoing description. In particular, this lighting system allows efficiently inducing a perception of warmth in the user as if he/she was effectively in the sunlight.

Finally, it is clear that modifications and variants can be made with respect to the present lighting system, without departing from the scope of the present invention, as defined in the appended claims.

Figure 5:
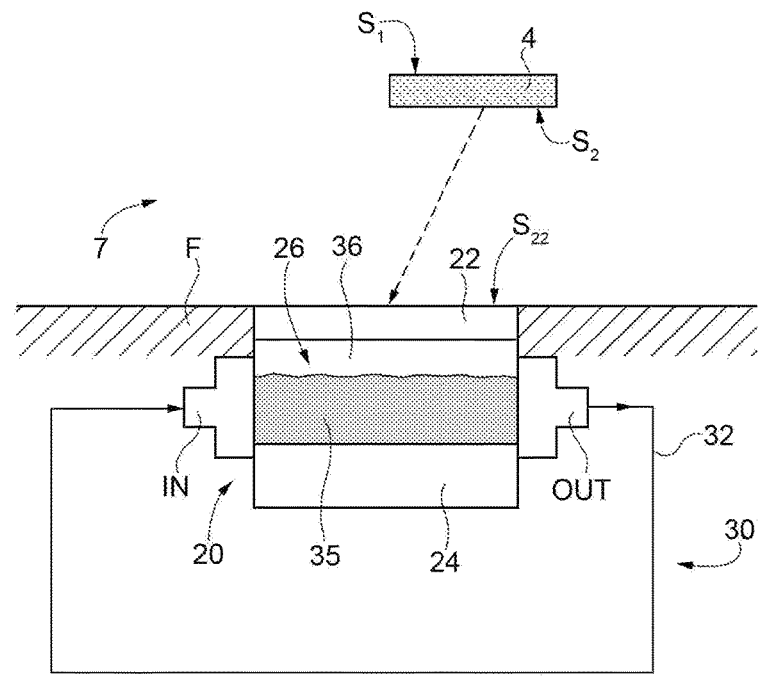
FIG. 5 schematically shows a cross-section of a system coupled to this lighting system.

For example, FIG. 5 shows a further embodiment, in which the lighting system 1 comprises a heating module 20, integrated, for example, in the floor F of the room 7. Without any loss of generality, the heating module 20 is described below with reference to the case of an embodiment including the diffuser panel 4. The heating module 20 may, in any case, be included in each of the embodiments described herein.

In detail, the heating module 20 comprises an upper region 22, designed to be walked upon by the observer and having a layered form. The upper region 22 is formed, for example, by glass or, in any case, a material having substantially zero or, in any case, extremely low absorption in the infrared and in the visible spectrum.

The heating module 20 also comprises a lower region 24, formed, for example, by white sand or light-coloured cobbles, or in any case by a material that substantially does not absorb visible radiation that impinges on it, but scatters it backwards, so as to act as a secondary source of diffused light. The lower region 24 is arranged beneath the upper region 22 and at a distance from the latter, such that the upper region 22 and the lower region 24 delimit a cavity 26. The cavity 26 is part of a fluidic circuit 30. In particular, in addition to the cavity 26, the fluidic circuit 30 comprises piping 32 (only shown schematically in FIG. 5); furthermore, the cavity 26 is in fluidic communication with the fluidic circuit 30 though an input gate IN and an output gate OUT.

A fluid 35 (for example, a liquid, such as water) circulates inside the fluidic circuit 30; furthermore, the cavity 26 receives the fluid 35 in input through the input gate IN, while it supplies the fluid 35 in output through the output gate OUT. The fluid 35 thus passes through the cavity 26. Furthermore, preferably, the fluid 35 does not completely fill the cavity 26, but only occupies a lower portion; in this case, as shown in FIG. 5, an upper portion (indicated by reference numeral 36) of the cavity 26 is occupied by air 36.

The heating module 20 is arranged in a way such that the infrared optical beam illuminates at least a part of a top surface $S_{22}$, which delimits the top part of the upper region 22. Furthermore, the fluid 35 (for example, a liquid) substantially does not absorb in the visible spectrum, and therefore does not absorb the visible optical beam, but absorbs in the infrared spectrum, and therefore absorbs the infrared optical beam; for example, for an absorption coefficient $\alpha_{1.4\ \mu m}$ of the fluid 35 at wavelength $\lambda=1.4$ µm, preferably the relation $\alpha_{1.4\ \mu m} \geq 0.1$ cm$^{-1}$, more preferably $\alpha_{1.4\ \mu m} \geq 0.3$ cm$^{-1}$, and even more preferably $\alpha_{1.4\ \mu m}$ cm$^{-1}$, holds. Furthermore, by defining $\alpha_{vis-MAX}$ as the maximum value of the absorption coefficient of the fluid 35 in the visible spectrum, preferably the relation $\alpha_{vis-MAX}/\alpha_{1.4\ \mu m}<0.4$, more preferably $\alpha_{vis-MAX}/\alpha_{1.4\ \mu m}<0.3$, and even more preferably $\alpha_{vis-MAX}/\alpha_{1.4}\ \mu m<0.2$, holds.

In use, the infrared optical beam heats the fluid 35, which subsequently transports the absorbed heat, for example, to different parts of the room 7, or outside of the room 7, according to the form of piping 32. In a manner in itself known, the piping 32 could, for example, form a heating coil (not shown); in addition, the fluidic circuit 30 could include, for example, one or more hydraulic pumps (not shown) and/or one or more valves (not shown), for example of the electronically controllable type.

Preferably, the visible optical beam leaving from the second surface S$_2$ is also directed onto at least a part of the top surface S$_{22}$. The visible optical beam then passes through the upper region 22 and the fluid 35, until it impinges on the lower region 24, where it scatters, in the direction of the room 7 again, thus contributing to the illumination of the latter.

In practice, the embodiment shown in FIG. 5 enables improving the comfort produced in the room 7 and optimizing the heat distribution. In particular, this embodiment enables recovering part of the heat associated with the infrared optical beam to heat non-illuminated parts of the room 7 or the outside environment, i.e. areas of space where an individual, not being warmed directly by the infrared optical beam, needs to benefit from a higher air temperature with respect to areas of space through which the infrared optical beam passes. Furthermore, if necessary, this embodiment enables discharging heat (in the summer for example), thanks to the fluid 35.

Again, with reference to the embodiments that include the heating module 20, is also possible that an optical element, such as a mirror arranged on a wall of a room, is interposed between the diffuser panel 4/chromatic mirror CM and the upper region 22. Regarding the heating module 20, it is possible that it has no lower region 24. In addition, the heating module 20 could be arranged, for example, on a wall of the room 7.

Regarding the CPCs 160, it is possible that the inlet openings have, for example, an area larger than the area of the corresponding emitters 158.

Regarding the optical filter 116, if present, this could be arranged in a different position with respect to that described.

Regarding the visible source 2, this could comprise a discharge lamp, such as a plasma source, or could comprise:
- a small wavelength optical radiation emitter (not shown), i.e. in the blue and/or near-ultraviolet region (for example, a radiation in the range 350 nm-490 mn), this emitter operating, for example, on the basis of physical processes of spontaneous and/or stimulated emission and being formed, for example, by a LED or a laser; and
- an optical-optical type of wavelength converter (not shown), which is designed to convert a first electromagnetic radiation, having a wavelength comprised in a first range of wavelengths and formed, for example, by at least a part of the radiation emitted by the aforesaid emitter, into a second electromagnetic radiation, having a wavelength comprised in a second range of wavelengths, this second range being at least partly formed by wavelengths longer than the wavelengths in the first range; for example, the second electromagnetic radiation could have a wavelength between 410 nm and 750 nm; furthermore, the optical-optical converter could be formed by a phosphor or a system of phosphors.

Preferably, the visible source 2 is formed by a source such that the dependency of the spectral density of the radiant flux (i.e. the radiant flux per unit wavelength) of the wavelength exhibits at least one peak that falls in the visible spectrum. The visible source 2 is thus preferably formed by a source that is different from a Planckian radiator, which is also known as a thermal radiator with a black body spectrum and is characterized by a radiant flux spectral density that has a peak in the near-infrared (for example, at a wavelength of approximately 1 μm). The visible source 2 is therefore preferably different, for example, from an incandescent or halogen source.

Embodiments of the type shown in FIG. 6 are also possible in which the visible source 2, of a type in itself known, generates a visible optical beam, already collimated or in any case one with a divergence of less than 2π sterad, preferably less than π sterad, and even more preferably less than 0.5*π sterad. In this case, the mirror 6 could be of a flat type. Purely by way of example, the embodiment shown in FIG. 6 contemplates the presence of the panel 4, although embodiments of the type shown in FIG. 7 are however possible in which a flat type of chromatic mirror CM is present.

Figure 7:
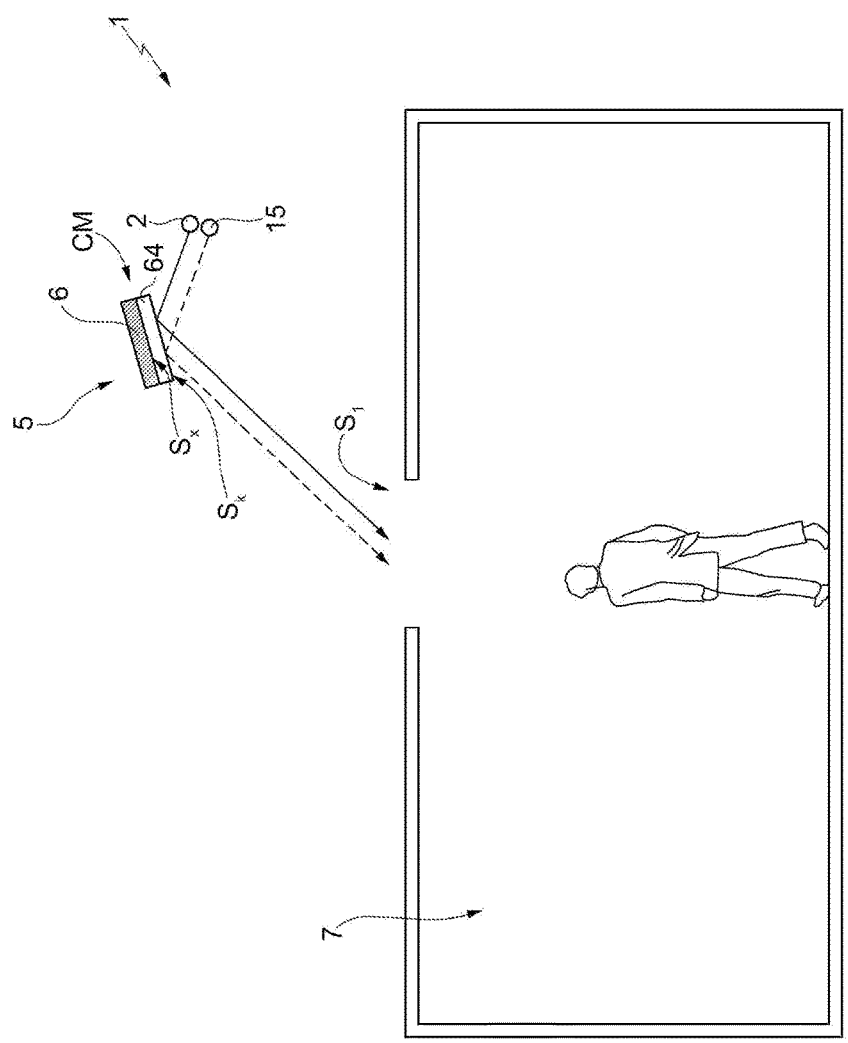

Similarly, in the embodiments shown in FIGS. 6 and 7, the infrared source 15 may generate an infrared optical beam, already collimated or in any case with a divergence less than 4π sterad, preferably less than 2π sterad, more preferably less than n sterad, and even more preferably less than 0.5*π sterad.

In practice, the infrared optical beam and the visible optical beam remain overlapping in a volume of space. In addition, there preferably exists at least one portion of this volume in which the direction of maximum radiance of the visible optical beam is close to the direction of maximum radiance of the infrared optical beam, i.e. these two directions coincide, or in any case do not differ from one another by more than 40°, preferably 30°, and even more preferably 20°. In this regard, it is understood that the radiance of a beam in a given plane means the radiant flux per unit solid angle per unit area emitted at a given point and in a given direction. In addition, for each point of the aforesaid volume portion, the width of the angular radiance peak of the visible optical beam is less than 15°, preferably less than 10°, and even more preferably less than 5°, while the width of the angular radiance peak of the infrared optical beam is less than 30°, preferably less than 20°, and even more preferably less than 10°.

Embodiments of the type shown in FIGS. 6 and 7, but without the reflecting system, are also possible. In addition, embodiments of the previously described type, but where the infrared optical beam is directed so as to penetrate in the room, where it overlaps with the visible optical beam and with the diffused light, without having first passed through the diffuser panel 4/diffusion layer 64 (according to the embodiment), are also possible.

Figure 8:
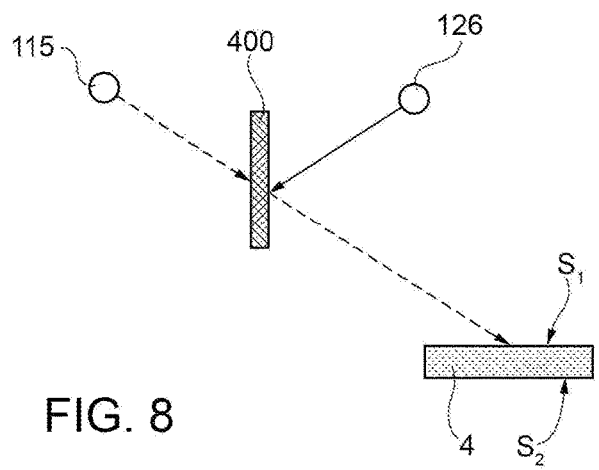
FIG. 8 schematically shows a cross-section of a portion of one embodiment of this lighting system.

Embodiments of the type shown in FIGS. 6 and 7, but including an optical beam splitter (shown in FIG. 8) are also possible. In detail, the optical beam splitter 400 couples the visible optical beam, generated by the visible source 2, and the infrared optical beam, generated by the infrared source 15. Without any loss of generality, in the embodiment shown in FIG. 8, the visible optical beam and the infrared optical beam are directed onto the diffuser panel 4. For example, the optical beam splitter 400 is a dichroic element of a type in itself known, which acts as an optical coupler. In particular, the optical beam splitter 400 is arranged so as to receive the infrared optical beam, generated by the infrared source 15, and transmit it along a first direction, such that the infrared optical beam then impinges on the diffuser panel 4. Furthermore, the optical beam splitter 400 is arranged so as to receive the visible optical beam, generated by the visible source 2, and reflect it along the first direction, so that it subsequently impinges on the diffuser panel 4.

Moreover, variants are possible in which the optical beam splitter reflects the infrared optical beam and transmits the visible optical beam.

In general, embodiments (not shown) corresponding to previously described embodiments, but further comprising the optical beam splitter 400 are however possible. For example, an embodiment of the type shown in FIG. 1 or 4 is possible, in which the optical beam splitter 400 is arranged on the foci line of the reflective surface $S_x$, so as to create two virtual foci lines, in which the illuminator 126 and the filament 115 are respectively arranged.

Figure 9:
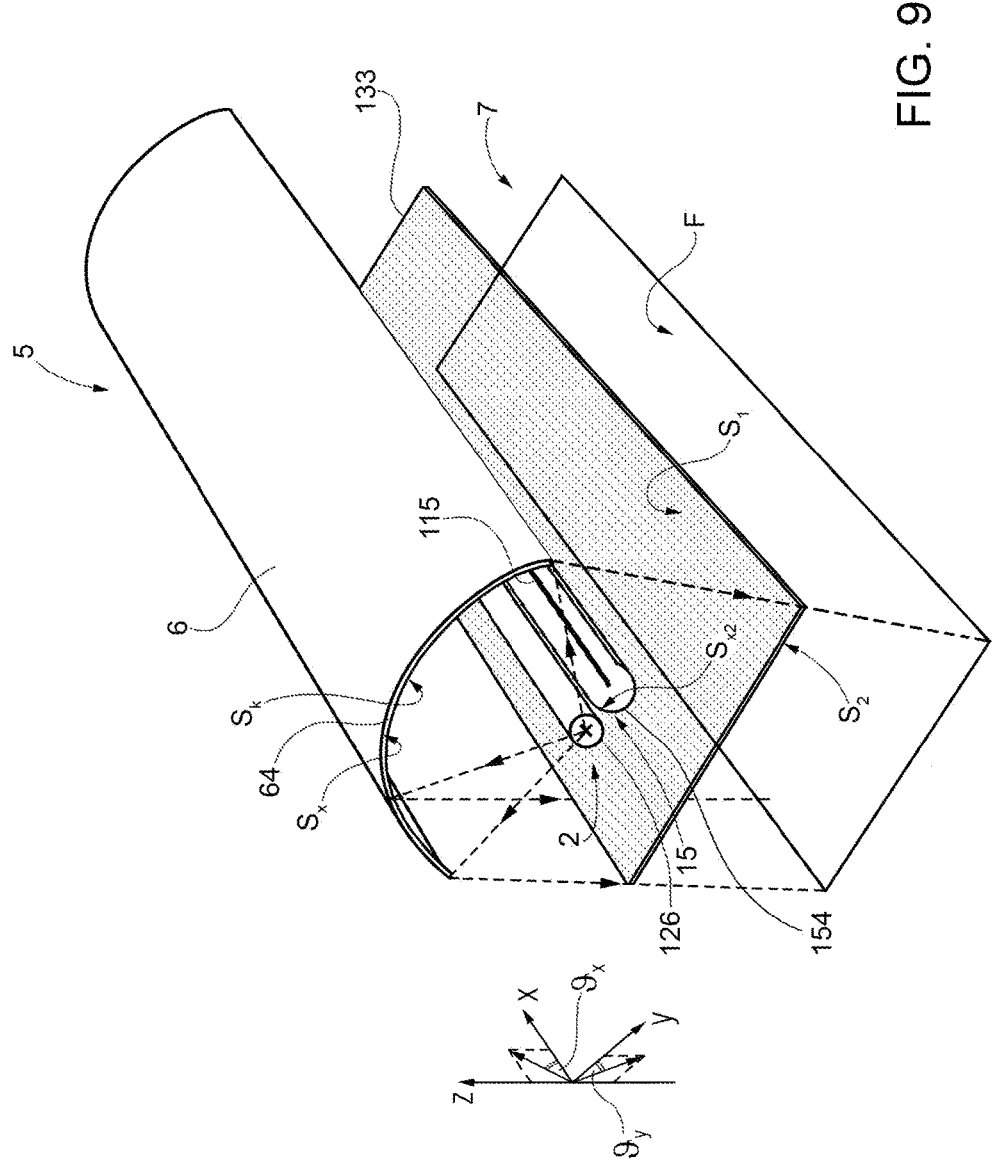

Embodiments like the previously described embodiments, but in which the diffuser panel 4 or the diffusion layer 64 (according to the embodiments) are delimited by an undulated or, in any case rough, surface, are also possible, this surface being designed to induce a further process of low-angle achromatic diffusion (for example, up to 20°, preferably 10°, and even more preferably 5°) in the visible radiation that passes through it, in order to further reduce the effect induced by the difference between the FWHMs of the angular luminance profiles of the visible optical beam in the xz and yz planes, or in any case in order to create an isotropic angular luminance profile, i.e. as far as possible the same in all planes containing the direction of the luminance peak for each point of the emission surface, so as to allow the observer to perceive the image of the sun as a circular disc. In addition, or in alternative, the diffuser panel 4 or the diffusion layer 64 (according to the embodiment) may include a further dispersion of micro-particles having diameters between, for example, 0.2 µm and 20 µm (preferably 0.7 µm-15 µm, and more preferably 1 µm-10 µm). However, as shown in FIG. 9, it is also possible that the aforesaid low-angle achromatic diffusion process is implemented by using a panel 133, referred to hereinafter as the achromatic panel 133, which is arranged optically downstream of the chromatic mirror CM or the diffuser panel 4 (for example, FIG. 9 refers to the case where the chromatic mirror CM is present). The fact that the infrared optical beam also passes through the achromatic panel 133 and/or the arrangement of the panel along the optical path followed by the visible optical beam are irrelevant.

In practice, on the basis of the foregoing teachings, it is therefore possible to implement an embodiment including a lighting system that comprises a visible optical source configured to emit a visible optical radiation and a chromatic optical device, which comprises a diffusion region and defines a first emission surface, arranged downstream of the diffusion region. The chromatic device is configured to receive the visible optical radiation and to generate a visible output beam on the first emission surface that has an angular luminance profile exhibiting a peak with FWHM below 20° in two mutually orthogonal planes containing the direction of maximum luminance. Furthermore, in each point of the first emission surface, the visible output beam comprises a direct component emitted in the direction of the luminance peak, and a diffuse component emitted at angles that differ, for example, by more than 40° from the direction of the direct component. For example, the CCT of the diffuse component is at least 1.2 times greater than the CCT of the direct component. Furthermore, the lighting system comprises an infrared source configured to define a second emission surface and to emit an infrared output beam, substantially without visible components, downstream of the second emission surface.

According to one variant, the first and the second emission surface coincide.

According to one variant, the angular luminance profile has respectively a first and a second FWHM in said two planes (xz,yz), the second FWHM being not more than twice the first FWHM.

According to one variant, the infrared optical source is configured to generate the infrared output beam such that it has an angular radiance profile with a peak having a FWHM below, for example, 90°, preferably 40°, in a first of the aforesaid two planes.

According to one variant, the peak of the angular radiance profile is at a distance of no more than 20° from the angular luminance profile, for each point of the first emission surface.

According to one variant, the FWHM of the angular radiance profile is two times lower than the FWHM of the angular luminance profile in the yz plane.

According to one variant, the visible output beam and the infrared output beam determine, in a third plane (F) downstream of the first and second emission surfaces, a first and a second spot that overlap for an area equal to at least 50% of the area of the larger of these spots, the first and second spots being defined by an illuminance and by a irradiance respectively equal to at least 50% of the maximum values of illuminance and irradiance of the visible output beam and infrared output beam on that third plane. According to one variant, the third plane is spaced from first emission surface by a distance of between one and three meters.

The invention claimed is:

1. A lighting system configured to simulate a window open to the sky and comprising an optical system including:
   a visible optical source configured to emit visible optical radiation; and
   a chromatic optical device comprising a diffusion region and defining a first emission surface, said chromatic device being configured to receive said visible optical radiation and to generate, on said first emission surface, a visible output beam, which has an angular luminance profile that exhibits a peak with FWHM below 20° in two planes, mutually orthogonal and containing the direction of maximum luminance; and wherein, in each point of said first emission surface, said visible output beam comprises a direct component, emitted in the direction of the luminance peak, and a diffuse component emitted at angles that differ by more than 40° from the direction of the direct component; and wherein the correlated colour temperature of the diffuse component is at least 1.2 times higher than the correlated colour temperature of the direct component;
   said lighting system being characterized in that it also comprises an infrared optical source configured to define a second emission surface and to emit, downstream of said second emission surface, an infrared output beam substantially without visible components; wherein the visible optical source comprises an illuminator having a shape elongated along a direction of elongation perpendicular to a first plane of said two planes, said illuminator comprising an array of emitters and an array of compound parabolic concentrators, each emitter being optically coupled to a corresponding compound parabolic concentrator; and wherein said infrared optical source is configured to generate said infrared output beam so that, in said first plane, it has an angular radiance profile with a peak having FWHM of less than 90°, said radiance peak being at a distance of no more than 20° from said luminance peak for each point of the first emission surface; and wherein said infrared optical source has a shape elongated along a direction perpendicular to said first plane; and wherein said lighting system further comprises a reflecting surface having the shape of a parabolic cylinder with the axis perpendicular to said first plane, said reflecting surface being configured to collimate said visible optical radiation and said infrared output beam in said first plane; and wherein said first emission surface is arranged downstream of the diffusion region or said diffusion region covers said reflecting surface and defines said first emission surface.

2. The lighting system according to claim 1, wherein the first and the second emission surfaces coincide.

3. The lighting system according to claim 1, wherein said angular luminance profile has respectively a first and a second FWHM in said two planes, said second FWHM being not more than twice the first FWHM.

4. The lighting system according to claim 1, wherein said infrared optical source is configured to generate said infrared output beam so that said radiance peak has FWHM of less than 40°, in said first plane.

5. The lighting system according to claim 4, wherein, in said first plane, the FWHM of said angular radiance profile is two times lower than the FWHM of said angular luminance profile.

6. The lighting system according to claim 4, wherein said first emission surface is elongated in a direction orthogonal to said first plane.

7. The lighting system according to claim 4, wherein said luminance profile is substantially invariant along a direction perpendicular to said first plane.

8. The lighting system according to claim 1, wherein the infrared optical source includes a Planckian emitter and an optical filter configured to filter visible radiation.

9. The lighting system according to claim 1, wherein the infrared output beam has a power in the IR B spectral region greater than the power in the IR A spectral region.

10. The lighting system according to claim 1, wherein the visible output beam and the infrared output beam determine, in a third plane downstream of the first and of the second emission surface a first and a second spot that overlap for an area equal to at least 50% of the area of the larger of said spots, said first and second spots being defined respectively by an illuminance and by a irradiance respectively equal to at least 50% of the maximum values of illuminance and irradiance of said visible output beam and infrared output beam in said third plane.

11. The lighting system according to claim 10, wherein said third plane is spaced from the first emission surface by a distance of between one and three meters.

12. A system comprising a lighting system according to claim 1 and a heating module arranged so as to receive said infrared output beam; wherein said heating module comprises a cavity optically accessible to the infrared output beam and also accessible to a liquid able to absorb at least part of the infrared output beam, said cavity also being coupled to a hydraulic circuit.

13. The lighting system according to claim 12, wherein the heating module also comprises:
   an upper region, which delimits the cavity; and
   a lower region, arranged so that, in use, the liquid is arranged between said lower region and the upper region, said lower region being configured to backward scatter in the visible spectrum.

* * * * *